(12) United States Patent
Kazmi

(10) Patent No.: US 8,411,555 B2
(45) Date of Patent: Apr. 2, 2013

(54) QUALITY BASED HANDOVER PROCEDURE BETWEEN CO-LOCATED CELLS

(75) Inventor: Muhammad Kazmi, Bromma (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 327 days.

(21) Appl. No.: 12/863,845

(22) PCT Filed: Mar. 13, 2008

(86) PCT No.: PCT/SE2008/050284
§ 371 (c)(1),
(2), (4) Date: Jul. 21, 2010

(87) PCT Pub. No.: WO2009/113928
PCT Pub. Date: Sep. 17, 2009

(65) Prior Publication Data
US 2010/0290435 A1    Nov. 18, 2010

(51) Int. Cl.
*H04J 11/00* (2006.01)
*H04Q 7/212* (2006.01)

(52) U.S. Cl. ............ 370/208; 370/252; 370/331

(58) Field of Classification Search .......... 370/208, 370/252, 331, 332
See application file for complete search history.

(56) References Cited

U.S. PATENT DOCUMENTS

| | | | |
|---|---|---|---|
| 2007/0036109 A1* | 2/2007 | Kwak et al. | 370/331 |
| 2008/0020779 A1* | 1/2008 | Ode et al. | 455/450 |
| 2008/0069077 A1* | 3/2008 | Yano et al. | 370/342 |
| 2008/0242308 A1* | 10/2008 | Gunnarsson et al. | 455/450 |
| 2009/0163208 A1* | 6/2009 | Rao | 455/436 |
| 2011/0103333 A1* | 5/2011 | Berggren et al. | 370/329 |
| 2011/0310846 A1* | 12/2011 | Ma et al. | 370/331 |
| 2012/0063391 A1* | 3/2012 | Shaheen | 370/328 |

FOREIGN PATENT DOCUMENTS

| | | |
|---|---|---|
| EP | 1 081 977 | 3/2001 |
| WO | WO 00/38463 | 6/2000 |
| WO | WO 2005/096657 | 10/2005 |

OTHER PUBLICATIONS

International Search Report for PCT/SE2008/050284, mailed Feb. 25, 2009.

* cited by examiner

*Primary Examiner* — Andrew Lee
(74) *Attorney, Agent, or Firm* — Nixon & Vanderhye, P.C.

(57) ABSTRACT

The present invention relates to cellular system and especially to handover between cells on different frequency carriers in an OFDM system or between cells in 2 systems adopting different radio access technologies (RAT), at least one of them being OFDM technology. A problem is the intra-cell interference impact on the quality a connected mode terminal measures in the own cell and in neighbor cells. This is a problem for cells based on OFDM technology, because intra-cell interference has no impact as compared to the inter-cell interference on the quality provided by the cell to a connected mode terminal, whereas in UTRA the intra-cell and inter-cell interference have the same impact on the quality provided. The solution to the problem is based on the insight that for cells that are located on the same site, the eNode B possess information on the power transmitted on the respective frequency carrier, and can adjust the quality as reported from the terminal on co-located OFDM cells. The adjusted quality measure enables an improved evaluation of the quality of co-located cells, for a potential handover. The invention also relates to embodiments on a 2-step handover, wherein handover to inter-frequency, or inter-RAT cell on another site is made as a handover to co-located inter-frequency/inter-RAT cell and a handover to an intra-frequency cell located at the other site.

17 Claims, 4 Drawing Sheets

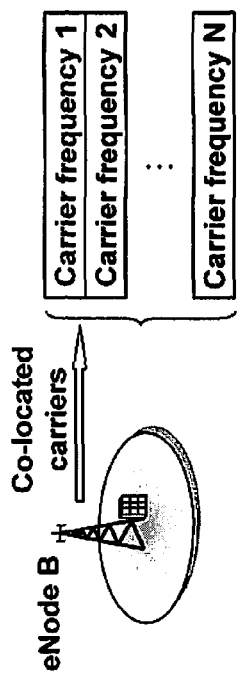
Fig. 1
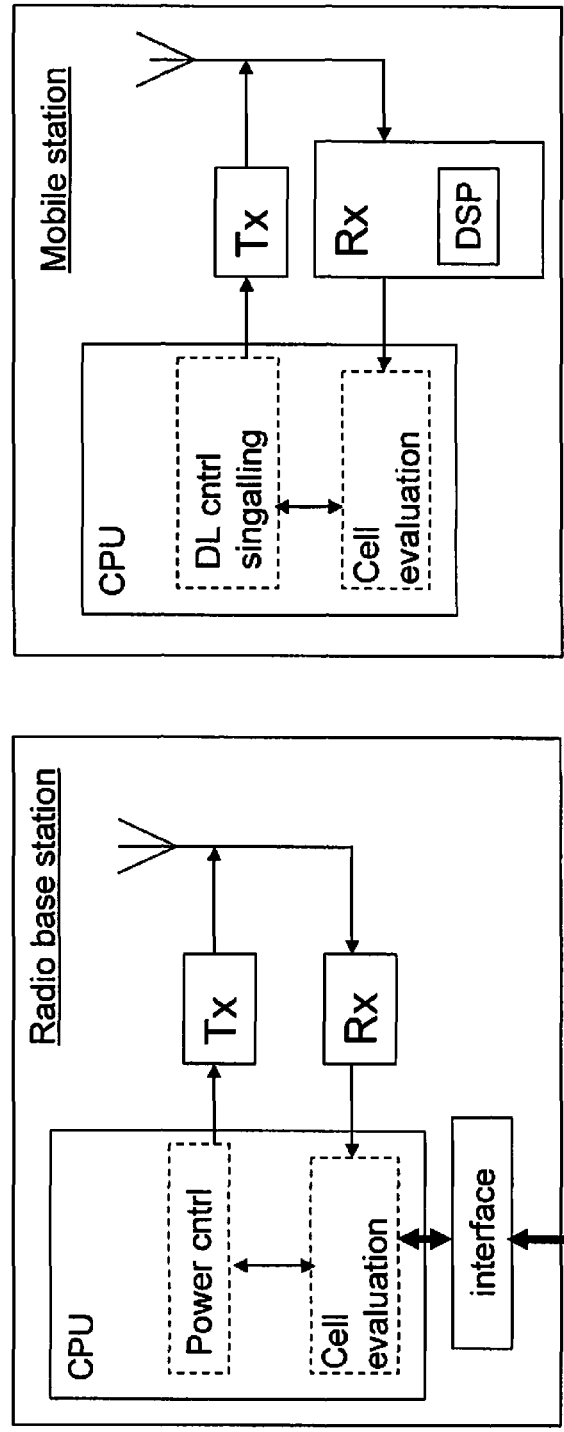

QUALITY BASED HANDOVER PROCEDURE BETWEEN CO-LOCATED CELLS

This application is the U.S. national phase of International Application No. PCT/SE2008/050284 filed 13 Mar. 2008, which designated the U.S. and the entire contents of which is hereby incorporated by reference.

TECHNICAL FIELD

The technology disclosed herein relates to cellular communication systems and to a method and radio base station adapted for improved evaluation of cells for serving a mobile terminal.

BACKGROUND

In order to meet high target bit rate requirement in E-UTRAN, efficient radio resource management (RRM) techniques are required. The desired user bit rate and quality of service should be maintained regardless of user's mobility within the coverage area. In wireless systems appropriate handover, which is one of the fundamental RRM techniques, is critical ensure the desired user performance. The handover execution is typically triggered by the user feedback: measurement reports or/and network configured events. Different types of measurements and events also give rise to various categories of handovers. In any case it is important that user quality is maintained after the handover to avoid ping pong and minimize the signalling associated with handover procedures.

Downlink Measurements for Mobility

In E-UTRAN the following three downlink neighbour cell measurements are specified primarily for mobility purpose [1]:

Reference symbol received power (RSRP)
Reference symbol received quality (RSRQ): RSRQ=RSRP/carrier RSSI
E-UTRA Carrier RSSI The RSRP and RSRQ measurements are performed by the UE, ie. the E-UTRA mobile terminal, for each cell on cell specific known pilot sequence called the reference symbols.

The E-UTRA carrier RSSI is measured over the entire carrier; it is the total received power and noise from all cells (including serving cells) on the same carrier. The two reference symbol based measurements (RSRP and RSRQ) are also the main quantities, which are likely to be used for the mobility decisions; this is described in later sections.

In general terms RSRP and RSRQ can be regarded as 'signal strength' type and 'signal quality' type measurements respectively. In WCDMA, CPICH RSCP and CPICH Ec/No are the corresponding 'signal strength' and 'signal quality' measurements respectively. In other words E-UTRAN RSRP and RSRQ measurements are analogous to WCDMA CPICH RSCP and CPICH Ec/No measurements respectively. Like in E-UTRAN, in WCDMA the CPICH Ec/No is the ratio of CPICH RSCP to UTRA carrier RSSI.

The neighbour cell measurements are typically averaged over long time period in the order of 200 ms or even longer to filter out the effect of small scale fading. Additional network configured time domain filtering can be used to further filter out the effect of fading.

There is also a requirement on the UE to measure and report the neighbour cell measurements (e.g. RSRP and RSRQ in E-UTRAN) from certain minimum number of cells. In E-UTRAN this number is 8 cells (comprising of one serving and seven neighbour cells) on the serving carrier frequency (or commonly termed as intra-frequency). This number is slightly lower (e.g. 4-6 cells) for measurements carried out on non serving carrier frequency.

UE Reported Events for Mobility

Instead of requesting the UE to report the entire measurement quality the UE can be configured to only report events, which in turn are triggered by the measurement reports. The events are then reported to the network. The events can be sub-divided into absolute and relative events.

An example of absolute event is when serving cell RSRP falls below an absolute threshold. Another example comprises of serving cell's RSRQ falling below an absolute threshold.

An example of relative event is neighbour cell's RSRQ becomes stronger than that of the serving cell by certain margin (i.e. relative threshold).

The cell(s) involved in evaluating an event may operate on the carrier frequency of the serving cell or they may operate on different carrier frequencies e.g. serving cell on carrier frequency F1 and neighbor cell on carrier frequency F2.

In response to the occurrence of one or more of the above events the network can take further actions such as handover decision, which requires it to send handover command to the UE.

Mobility Scenarios

The above described measurements and events are used for mobility decisions. There are basically two kinds of mobility scenarios:

Idle mode mobility: cell reselection
Connected mode mobility: handover

The cell reselection is mainly UE autonomous function without any direct intervention of the network. The cell reselection decision at the UE is based on the downlink measurements on the serving and target cells. The network can configure the UE to use RSRP or/and RSRQ and the associated absolute or relative thresholds for cell reselection. The configuration is carried out by transmitting the relevant information and parameters on the broadcast channel. Thus to some extent the UE cell reselection behaviour is still controlled to some extent by the network. The standard also specifies some rules that govern the UE behaviour when performing cell reselection.

The handover on the other hand is fully controlled by the network through explicit UE specific commands and by standardized rules in the specification. The reported events are exclusively used for handovers. In addition the actual measurement reports may also be used by the network for executing handovers.

The E-UTRAN is frequency reuse-1 system. This means the geographically adjacent neighbour cells operate on the same carrier frequency. An operator may also deploy multiple frequency layers within the same coverage area. In addition an operator may deploy multiple access technologies in the same coverage area. Especially an operator would like to ensure that its legacy network (e.g. GSM, WCDMA etc) inter-works with E-UTRAN. Therefore, idle mode and connected mode mobility in E-UTRAN could be broadly classified into three main categories:

Intra-frequency mobility (idle and connected modes)
Inter-frequency mobility (idle and connected modes)
Inter-RAT mobility (idle and connected modes)

In intra-frequency mobility UE moves between the cells belonging to the same carrier frequency. This is the most important mobility scenario since it involves less cost in terms of delay due. In addition an operator would have at least one carrier at its disposal that it would like to be efficiently utilized.

In inter-frequency (IF) mobility the UE moves between cells belonging to different carrier frequencies but of the same access technology. This could be considered as the second most important scenario.

In inter-RAT mobility the UE moves between cells that belong to different access technologies such as between E-UTRAN and WCDMA, E-UTRAN and GSM or vice versa.

IF and IRAT Handover Phases

Inter-frequency and IRAT mobility requires the UE to measure cells also operating on non serving carrier frequency and different access technology respectively. These measurements are performed during idle gaps during which UE cannot receive data. To minimize the interruption of data reception the gap-assisted measurement should be performed only when deemed necessary. Therefore inter-frequency and IRAT handover comprises of two parts: triggering of gap assisted measurements and the handover decisions based on the comparison of measurement results between the serving and target cell. The triggering phase is initiated by the absolute event(s) based on the measurements carried out by the UE from the serving cell.

On the contrary measurements on intra-frequency cells don't require any measurement gaps. Therefore such measurements don't cause any interruption in the data.

IF and IRAT Handover Evaluation Criteria

Signal strength (e.g. RSRP) and signal quality (e.g. RSRQ) are the two main measurements which can be used for configuring events to trigger start of gap assisted measurement as well to take handover decisions.

Let's denote RSRP and RSRQ from serving cell on serving carrier frequency (F1) by $\alpha_s^1$ and $\beta_s^1$ respectively. Similarly RSRP and RSRQ measured by the UE during idle gaps on target carrier frequency (F2) on the target cell can be represented by $\alpha_t^2$ and $\beta_t^2$ respectively.

Let's now consider one typical example of inter-frequency handover that makes use of both measurements. In this example the first the part of IF handover phase i.e. triggering of gap assisted measurements on the cells operating on the target carrier frequency (F2) can be initiated when the following condition is satisfied:

$$(\alpha_s^1 < \gamma_1) \text{ OR } (\beta_s^1 < \gamma_2) \tag{1}$$

Where $\gamma_1$ and $\gamma_2$ are absolute thresholds corresponding to RSRP and RSRQ respectively.

Similarly the second part of IF handover procedure i.e. decision to perform handover to target cell on non serving carrier (F2) can be taken when the following condition is satisfied:

$$\lfloor (\alpha_t^2 - \alpha_s^1) \geq \delta_1 \rfloor \text{ AND } \lfloor (\beta_t^2 - \beta_s^1) \geq \delta_2 \rfloor \tag{2}$$

Where $\delta_1$ and $\delta^2$ are relative thresholds corresponding to RSRP and RSRQ respectively. It is evident from (2) that IF handover should ensure that after handover both signal strength and signal quality to be experienced from the target cell should improve compared to those from the serving cell.

A similar handover evaluation methodology can be applied when performing IRAT handovers e.g. between E-UTRAN and WCDMA or vice versa.

Infra-Frequency Handover Evaluation Criteria

The measurements for intra-frequency handover are performed in parallel to the data reception. Therefore only the second phase similar to the one expressed in (2) can also be used. The difference is that in case of intra-frequency handover the comparison will be drawn between the serving and target cells, which operate on the same carrier (F1). This means handover to the target cell is done provided condition expressed in (3) becomes satisfied:

$$\lfloor (\alpha_t^1 - \alpha_s^1) \geq \delta_1 \rfloor \text{ AND } \lfloor (\beta_t^1 - \beta_s^1) \geq \delta_2 \rfloor \tag{3}$$

Co-Located Cell Deployment Scenario

In many densely populated areas such as hotspots an operator deploys more than one cell on the same base station site, e.g. several cells in one sector. In UTRAN system this corresponds to multiple cells of 5 MHz each. In E-UTRAN similar deployment will exist but their bandwidth may differ since several bandwidths can be used in E-UTRAN e.g. 1.4 MHz, 5 MHz, 10 MHz, 20 MHz etc. Such cells on different carriers but on the same site are also termed as co-located cells. The term 'co-located cells' is a more general term and thus should not be limited to only inter frequency (IF) cells on the same technology. For instance co-located cells may also comprise of cells belonging to different access technologies such as E-UTRAN, UTRAN and GERAN. The IF and IRAT handovers and cell reselection are to be performed between the co-located cells as well as between non co-located cells on different carriers i.e. between cells on different base station sites. FIG. 1 illustrates a base station site with a number of co-located cells each assigned a respective frequency carrier.

Problems; Quality Measurement Objectives and Limitations

The goal of quality measurements e.g. CPICH Ec/No and RSRQ in WCDMA and E-UTRAN respectively is to enable the network to predict the long term average signal quality that would be experienced by the UE at a particular location in a particular cell. This helps the network to perform handover to the cell, which would guarantee the desired quality to the UE e.g. desired user throughput or service bit rate. In downlink limited scenarios such as in high rise buildings or underground stations, it is important that quality measurement in addition to the signal strength is used in handover procedures. In such scenario the quality based IF or IRAT handovers in particular provides an opportunity to seek a cell on another frequency or RAT that would maintain the desired service quality.

As mentioned in preceding sections that RSRQ (or CPICH Ec/No) is the ratio of signal strength to carrier RSSI (i.e. total interference). In general the quality measurement (Qrx) can be expressed as follows:

$$Q_{rx} = \frac{P_{rx}}{I + N_o} \tag{4}$$

Where:

$P_{rx}$=Received power of pilot or reference signal i.e. signal strength part e.g. RSRP in case Qrx is RSRQ.

I=Total interference $N_0$=noise from all sources including other systems

The total interference (I) can be split into intra-cell and inter-cell interference as expressed in (5):

$$Q_{rx} = \frac{P_{rx}}{I_{intra-cell} + I_{inter-cell} + N_0} \tag{5}$$

Where:

$I_{intra-cell}$ is the total received power from the cell on frequency $F_j$ whose quality is measured and $I_{inter-cell}$ is the interference received from all other neighbour cells on the same carrier frequency i.e. $F_j$.

In OFDMA system the intra-cell interference is virtually non existent. This means the quality of cell i on frequency $F_j$ should be determined by the interference contribution from all cells on carrier $F_j$ except that from cell i. Therefore ideally the interference component of the RSRQ should exclude the intra-cell interference ($I_{intra-cell}$) part. But exclusion of this part of interference would require significantly complex computation in the UE. The complexity will increase with the number of cells to be measured; UE has to perform this measurement from several cells on each carrier frequency.

The quality measurement such as RSRQ should predict the true user downlink quality, which should be seen when it actually receives data in terms of user bit rate or throughput. But the inclusion of intra-cell interference in quality measurement especially in OFDMA system leads to some discrepancy in terms of tracking the actual quality of the cell for a given user. The further problem arises when serving and target cells are located on different base station sites. In E-UTRAN the load information of cells is not exchanged between the base stations. Secondly as compared to the serving cell the UE may experience completely different propagation conditions (e.g. due to different shadowing effect) from a non-located target cell. This could in some scenarios give rise to significantly different intra-cell interference levels between the non co-located serving and target cells. Since the serving eNode B does not have the means to apply proper correction when comparing the quality of serving and target cells, therefore direct comparison for handover decision may lead to service degradation or ping pong effect. For instance consider the situation expressed by (6), where serving and target cells are located in different base station sites:

$$RSRP_t^2 - RSRP_s^1 \geq \gamma_1 \text{ but } RSRQ_t^2 - RSRQ_s^1 < \gamma_2 \qquad (6)$$

Since both conditions (signal strength: RSRP and signal quality: RSRQ) are not satisfied for a given user therefore serving eNode B will not perform handover to the target cell. However in reality the target cell RSRQ might be worse due to dominating intra-cell interference and this target cell may also have resources to accommodate this given user.

SUMMARY

The technology disclosed herein addresses the problems involved with estimating quality for evaluating cells for potential handover.

The solution to the problem is based on the insight that for co-located cells the radio base station that serves a terminal with communication can be adapted for compensating for the intra-cell interference in the quality measured and reported by the terminal in the serving cell as well as the quality the terminal measures and reports to the serving base station on cells that are co-located with the serving cell.

The compensation of the quality measures is based on the intra-cell interference corresponds to the power transmitted on the OFDMA frequency carrier. When comparing the quality measure/s as reported from the terminal on a serving or a co-located OFDMA cell, the transmitted power on frequency carrier is compensated for.

One aspect of the technology disclosed herein is a base station that is adapted to compensate the quality measures on co-located cells that it receives from a mobile terminal it serves, by adjusting for the power transmitted on the respective co-located cells carrier, and adapted to compare the compensated quality measures of the co-located cells when evaluating cells to find the best suited for serving the terminal.

An other aspect of the technology disclosed herein is a mobile terminal that is adapted to receive information on co-located cells from a serving base station, adapted to receive a compensator factor respective co-located cell, and arranged to measure the quality of the co-located cells and adjust the quality measure with the respective compensator factor and arranged to use compensated quality measures when evaluating the quality measures for a potential triggering of an event report to be sent to the radio base station.

A further aspect of the technology disclosed herein is a method of evaluating cells for a potential handover, and that comprises the steps of, receiving measures from a terminal on the quality of a first serving cell and of a second cell that is co-located with the serving cell. Either of the first and second cell or both of them is/are a cell/s that belong to an OFDM system. The downlink carrier power of the respective first and/or second cells that is/are operating in the OFDM system is detected. An intra-cell interference component in the OFDMA cell measure/s is then compensated for by reducing the downlink carrier power from the quality measure as reported by the terminal. The quality measures of the first and second cell are then evaluated with compensated quality measure/s the one or two of the cells that are OFDM cell/s, for the purpose of making a potential handover.

Further embodiments of the technology disclosed herein relates to a two step handover. It relates to a situation when a terminal served by a first cell, should be best served by a third cell that operates on another OFDM carrier than the first cell or if the first cell is operating a system applying another radio access technology that OFDM the third cell is a OFDMA cell. The problem is the serving radio base station cannot identify the third cell as the best or the radio base station does not trust the quality measure and the evaluation result of the third cell being the best. This is due to quality measures on non co-located cells are not very trust worthy. The two step handover comprises:

An inter-frequency or inter-RAT handover to a OFDM cell on the same site as the serving cell
An intra-frequency handover between OFDM cells on different sites In a first decision to make the inter-frequency handover, improved quality is the decisive parameter and handover is decided if quality improves and signal strength in the target cell is at least at a predefined level or at least the same as in the serving cell.

In a second decision, to make the intra-frequency handover, improved signal strength is the decisive parameter and handover is decided if the signal strength improves and the quality is at least at a predefined level or at least the same as in the serving cell.

The order in which the intra-frequency and the inter-frequency or inter RAT handovers are performed may be swapped owing to the situation when the first handover is initiated. Advantages of the Technology disclosed herein are:

The desired quality of the link can be maintained.
The ping pong effect will be reduced.
The system throughput can be improved.

In an embodiment of the technology disclosed herein the need for gaps to measure on inter-frequency or inter RAT cells is reduced

DESCRIPTION OF THE DRAWINGS

FIG. 1 is an illustration of a single base station site and the cells on the site represented by corresponding frequency carriers.

FIG. 2 is a block diagram of a radio base station.

FIG. 3 is a block diagram of a mobile station.

DESCRIPTION OF PREFERRED EMBODIMENTS

Figure 4:
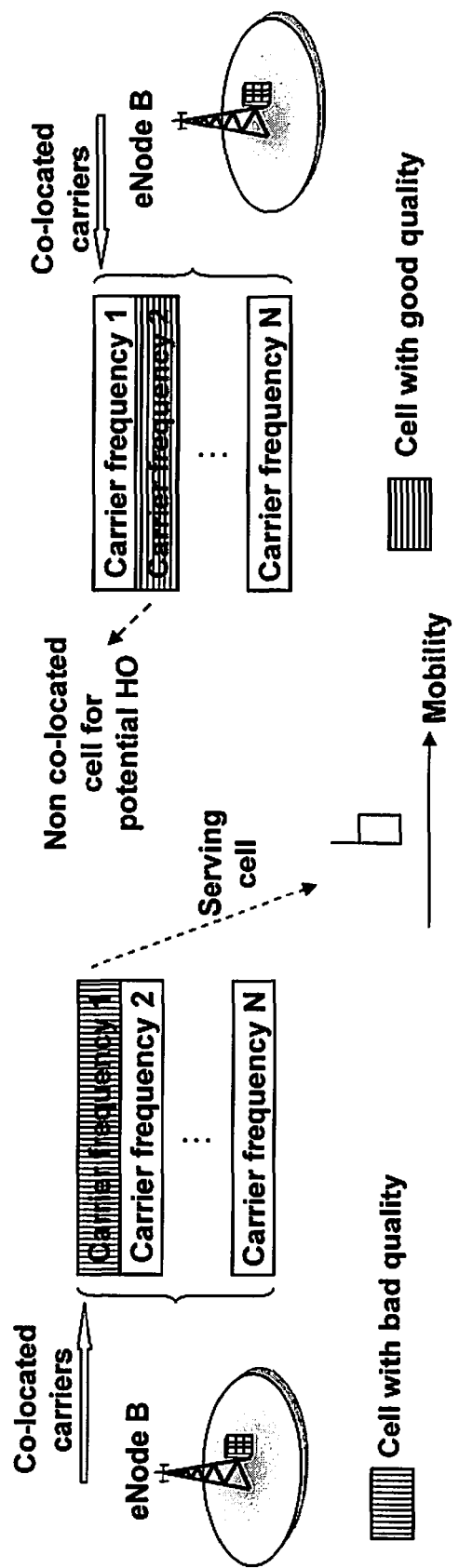
FIG. 4 is the same as FIG. 1 albeit with two base station sites.

Compensation of Intra-Cell Interference for Co-Located Cells

FIG. 1 illustrates a base station site, with a number of frequency carriers assigned to the base station, for each carriers to support a corresponding cell. In the example of FIG. 1 the radio base station B1 is within the LTE system and in that system radio base stations are named eNodeB. The cells are co-located and have the substantially the same geographical coverage, and that is indicated with an ellipse surrounding the eNodeB B1. For that reason a connected mode mobile terminal served by any of the co-located cells experience about the same RSRP, i.e. signal strength, from all the co-located cells and report on them to the serving cell. The traffic load varies between the co-located cells and for that reason the RSRQ, i.e. quality measured by the terminal on the various co-located cells vary. Moreover, as explained in the prior art section the terminal cannot separate intra-cell interference from inter-cell interference and noise when making the quality measures on neighbour cells, while for LTE cells the intra-cell interference have no impact on the quality as provided to the terminal. Therefore the quality measure as reported by terminals on neighbouring LTE cells is not trustworthy. Two types of mistakes can be made when evaluating cells for a potential handover:

1. The quality of the target cell is underestimated owing to the target cell is serving a high traffic load and its intra-cell interference is therefore being high.
2. The quality of the target cell is overestimated as compared to that of the serving cell, owing to the serving cell quality measure is underestimated owing to a high traffic load and its intra-cell interference is high.

The technology disclosed herein is based on the insight that when performing quality based handovers between the co-located cells the eNode B in E-UTRAN can itself exclude the intra-frequency interference contribution as follows: The eNode B is aware of the transmitted carrier power of all co-located cells on the same site. Secondly the position of the UE with respect to the serving and target co-located cells is the same; this means UE will experience same shadowing effect. Thus the base station can predict the actual quality of the target cell if it is co-located with the serving cell.

This compensation is accurately performed by a base station for co-located cells since transmitted carrier power information is available at the base station for the co-located cells and the quality measurements done by the UE from all co-located cells experience the same average path loss (or same average path gain) due to same shadow fading.

Furthermore the compensation can be either performed by the base station or by the UE when the UE compares the cells. The compensation at UE can be done either by explicitly signalling the compensation factor $\Delta$, which is simply the difference between the transmitted carrier power of serving and target cells in logarithmic scale, or ratio of the transmitted carrier of serving and target cells in linear scale. Another possible is that the compensation factor $\Delta$ is included in the threshold, i.e. $\gamma_2$ in Equation 6, used for comparing serving and target cells' qualities. The thresholds are signalled to UE for comparing cells and generating events.

Regardless whether compensation is done at the base station or UE, the compensation is expressed in logarithmic scale when comparing signal qualities between cell 1 and cell 2 as described further below:

The intra-cell interference or intra-cell contribution is the total power received from the cell whose quality is measured. It can be expressed as:

$$P_A + g_A \qquad (7)$$

Where: $P_A$ and $g_A$, are the average cell transmitted carrier power and average path gain experienced by UE from cell A.

The quality measure (Q) e.g. RSRQ in logarithmic scale is written as:

$$RSRQ = RSRP_{dBm} - (I_{intra-cell} + I_{inter-cell} + N_0)_{dBm} \qquad (8)$$

To eliminate intra-cell contribution from quality measure the intra-cell contribution should be subtracted. It can be done more accurately when comparing the qualities of two cells (cell 1 and cell 2) as follows:

$$RSRP_1 - (I_{intra-cell1} + I_{inter-cell1} + N_0) - RSRP_1 + (I_{intra-cell1} + I_{inter-cell1} + N_0) + P_1 + g_1 - P_2 - g_2 \qquad (9)$$

Where: $g_1$ and $g_2$ are the average path gains experienced by UE from cell 1 and cell 2.

In case of co-located cells the shadowing is the same therefore:

$$g_1 = g_2 = g$$

This means (9) becomes:

$$\text{Quality\_1st\_cell} - \text{Quality\_2nd\_cell} + P\_1st\_cell - P\_2^{nd}\_cell \qquad (10)$$

As shown by (10) that the rationale behind the above expression is that the application of the compensation factor ($\Delta$), which is the difference in transmitted carrier powers P1 and P2 from cell 1 and cell 2 respectively, eliminates the intra-cell interference from both cells.

Radio Base Station and Mobile Terminal

FIG. 2 is a block diagram of a radio base station adapted according to the technology disclosed herein. It comprises a radio transmitter and a radio receiver that are both connected to an antenna system and that are controlled by software run on a computer processor. There is one power control software module that controls the power transmitted on the respective frequency carrier. There is also a software module that evaluates the quality measures as received from the mobile terminal and decides on a potential handover of the mobile station. When the radio base station is an eNode B, the power control module provides information to the evaluation module on the power transmitted on the respective frequency carrier. The evaluation module is arranged to adjust the quality measures of co-located frequency carriers, i.e. cells and to use the compensated values when comparing the quality value of a co-located cell with the quality value of the serving cell.

If the radio base station instead of being an eNodeB, belongs to another access technology than OFDM, the evaluation module receives information on the power transmitted co-located OFDM cell via an interface that connects the radio base station to an eNodeB on the same site.

FIG. 3 is a mobile station block diagram. The mobile station comprises a receiver and a transmitter that are connected to an antenna system, and that are controlled by software run on a computer processor. The mobile station receiver also comprises a digital signal processor that receives signal samples from the receiver, detects the radio signals and measure the quality on the downlink of the serving cell and on the neighbouring cells. Just as for the base station there is a cell evaluation software module run on the computer processor. It receives the compensation factors, the serving cell quality measures and the neighbouring cell quality measures and performs the cell evaluation. In case the evaluation results in an event being triggered, the cell evaluation module triggers the event being reported via a downlink control signaling software module.

The block diagrams and description of the radio base station and mobile station, only describes the blocks essential for performing the technology disclosed herein, and for the sake of conciseness, the details on the implementation is left out.

Two Step Handover Concept.

When quality based handover to a non co-located cell located in base station site k is required or even if quality based handover is needed due to downlink limited situation the network adapts 2-step approach. There are 3 embodiments:

In the first embodiment the serving base station first performs inter-frequency handover to a co-located cell on non serving carrier Fj (or on RATi) provided its quality is acceptable and secondly if coverage on Fj (or on RATi) becomes worse then perform intra-frequency handover i.e. on the same Fj or RATi.

In second embodiment the serving base station first performs intra-frequency handover to a cell (on the serving carrier) located in site k and if quality does not improve then inter-frequency (or IRAT) handover to a co-located cell is performed at base station site k.

In another embodiment the serving base station performs inter-frequency (or inter-RAT) handover to a non co-located cell at base station site k but the new base station (k) immediately checks if new cell quality is acceptable e.g. by requesting reporting of absolute events or measurement reports.

Quality Based Handover Across Non Co-Located Sites

FIG. 4 shows the scenario comprising of multiple co-located cells available on each base station site. It illustrates handovers between non co-located cells. Though not shown in the FIG. 4 but each site may also have more than one access technologies e.g. N E-UTRAN and M UTRAN carriers per site and so on.

In this type of setup several types of handover (or cell reselection) can be performed: intra-frequency handovers within a site i.e. between sectors, intra-frequency handovers between non co-located cells on different sites, IF/IRAT handovers between co-located cells and IF/IRAT handovers between non co-located cells (i.e. between different base station sites).

The need for a particular type of handover depends upon several factors: radio conditions (e.g. signal strength, signal quality), the type of handover algorithm and procedures implemented in the network. The intra-frequency handover is the most fundamental and important type of handover. In several scenarios an intra-frequency handover might be sufficient to ensure that UE is able to maintain the desired quality and coverage when moving in the coverage area. However as stated before in downlink limited scenarios such as in high rise buildings the other neighbour cells on the same carrier might also be receiving similar level of inter-cell interference. However it is likely that the interference situation on other carriers and RAT is relatively moderate. Under these circumstances IF or IRAT HO to prevent deterioration of the on going service is an extremely useful strategy.

Figure 5:
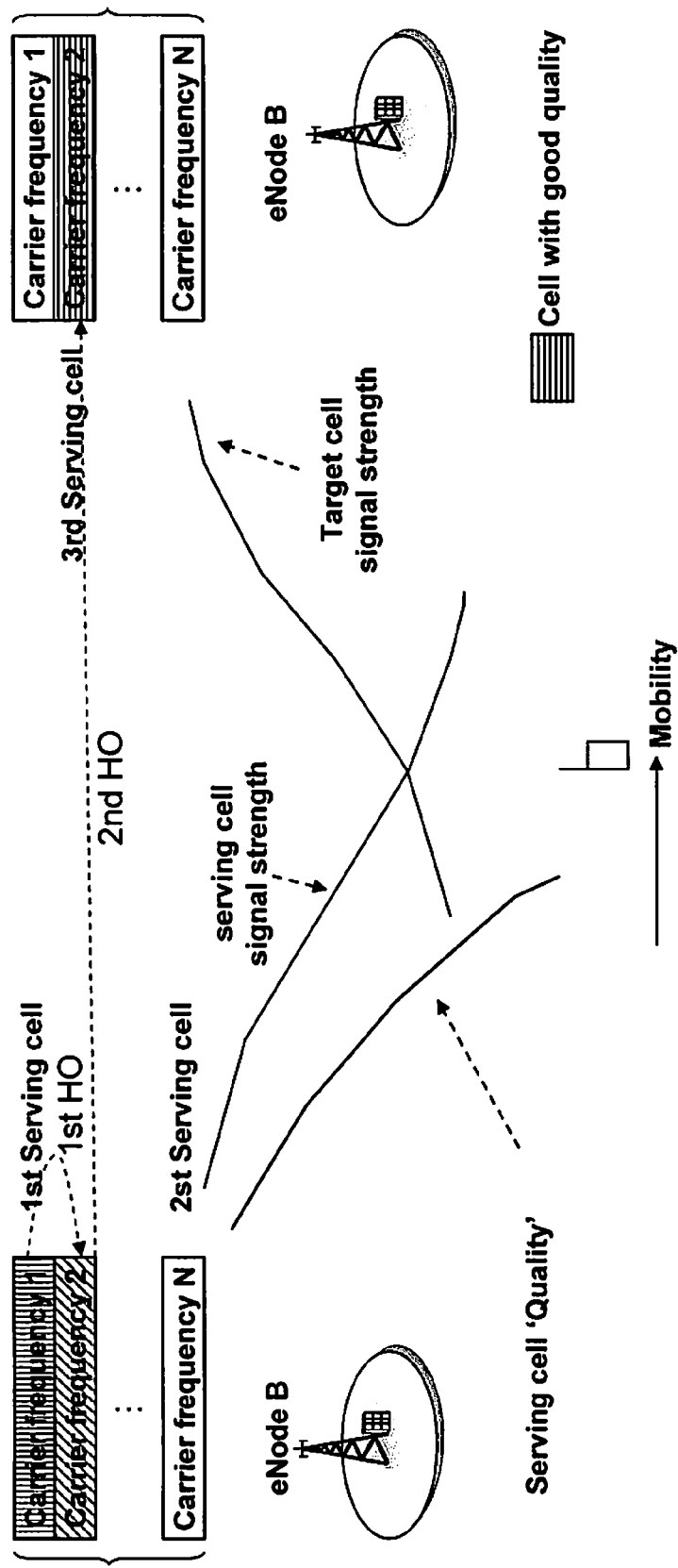
FIG. 5 is the same as FIG. 4 albeit in a situation of a 2-step HO.

As an example the conditions expressed by (1) in the prior art section would indicate if the serving cell signal strength or signal quality on frequency F1 is falling below the desired threshold level. This could trigger the gap-assisted measurement procedure, which would require the UE to perform measurements on cells on another carrier or RAT and report necessary events. As shown in FIG. 2b and according to (2) in the prior art section if the signal quality and signal strength from the non co-located cell on carrier $F_2$ are better than those of the serving cell on carrier $F_1$ then in the state of the art mechanism the network will directly send handover command directing UE to perform handover to this non co-located cell. But as described in previous section the comparison of signal quality (e.g. RSRQ), which also incorporates intra-cell interference, may lead to incorrect estimation of target cell quality especially when intra-cell interference is dominating. To avoid this situation the 2-step handover procedure should be used. This can be done in various ways. The following three mutually exclusive methods are described:

Co-located IF/IRAT followed by intra-frequency HO
    Intra-frequency followed by co-located IF/IRAT HO
    Non co-located IF/IRAT HO followed by Immediate Quality Verification Co-Located IF/IRAT Followed by Intra-Frequency HO If the serving cell has poor quality for instance due to downlink limited situation (i.e. high interference from other cells) the network is likely to seek a cell with better quality on another carrier or on another RAT. This is illustrated in FIG. 3, when the serving cell quality becomes bad due to high interference on the serving cell carrier, the gap assisted measurements on IF or IRAT is triggered. According to the technology disclosed herein the network (i.e. serving eNode B in E-UTRAN) first performs inter-frequency, e.g to carrier frequency 2, or IRAT handover to a cell, which is co-located to the serving cell, i.e. in the same base station site. This co-located cell, i.e. the second serving cell, may not be the best cell but its quality should be within an acceptable limit. If, after the inter-frequency handover has been performed, the coverage is found to be bad then the network can perform intra-frequency handover. This is illustrated in FIG. 5 as the $3^{rd}$ serving cell.

The handover decision is based on the comparison of serving and target cells' signal qualities (e.g. RSRQ). The co-location of cells easily allows the network (or serving eNode B) to determine the average intra-cell interference contribution in the serving and target cells. The intra-cell interference can be eliminated from the reported results prior to handover decision. This will ensure more accurate selection of cell in terms of good signal quality. The ratio of intra-cell interference from the serving to target co-located cells is simply the ratio of total transmit power from the serving to target co-located cells. The average signal strength, which is solely based on pilot power measurement by UE from co-located cells, is very similar unless pilot power setting is different. But signal qualities could still differ since that is dependent on load or interference on different co-located carriers. Therefore in some scenarios the network can omit the gap-assisted measurements and decide on a handover between co-located cells based on signal strength from the serving cell. The measurements (signal strength and quality) from serving cell do not need gaps. One scenario is when interference or load on co-located carriers is low e.g. eNode B is isolated or shielded from other neighbouring eNode B:s. Another example is when the load or interference is high on the serving carrier; this forces eNode B to promptly try to handover to another co-located cell provided signal strength is good enough.

Infra-Frequency Followed by Co-Located IF/IRAT HO

This procedure is also initiated when the serving eNode B discovers the need for performing inter-frequency handover to a non co-located cell due to downlink limited situation, i.e. the signal strength drops.

Figure 6:
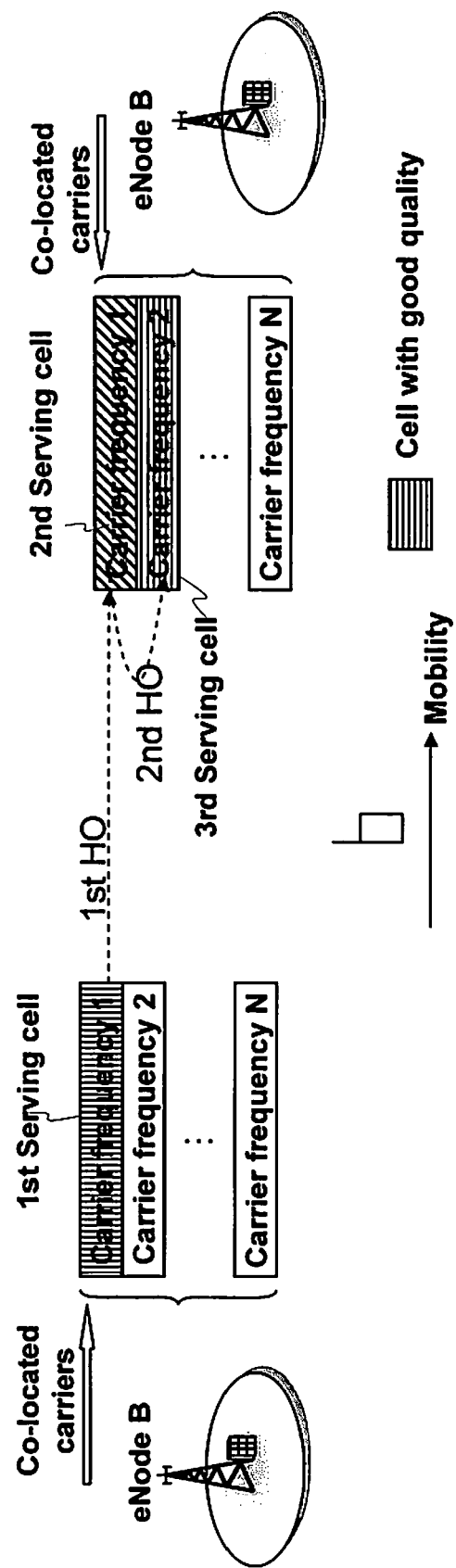
FIG. 6 is the same as FIG. 4 albeit in an alternative situation of a 2-step HO.

This embodiment is the converse of the first embodiment described in the above section. According to this embodiment the network, i.e. primarily the serving eNode B, first performs intra-frequency handover to the same site in which the non co-located inter-frequency cell is found to have some reasonable quality. FIG. 6 illustrates this first handover with a intre-frequency handover between cells on the first frequency carrier. After the intra-frequency handover the new eNode B can decide if inter-frequency handover or an IRAT handover to another co-located cell is needed or not. The old eNode B may also indicate to the new eNode B via X2 interface (eNode B to eNode B interface) the need for performing or at least checking the need for inter-frequency handover. It may also recommend the potential cell(s) for checking the need for handover. FIG. 6 illustrates the situation of a second handover is being performed to a co-located cell on the second frequency carrier.

This embodiment is useful in situations where none of the co-located cell on the serving base station site bears an acceptable quality for a given user.

Non Co-Located IF/IRAT HO Followed by Immediate Quality Verification

In this embodiment if IF/IRAT HO to a non co-located cell is required the network (or serving eNode B) does perform the inter-frequency handover to this cell as in the state of the art method. But in addition the new eNode B will immediately check whether the downlink quality with respect to the new cell is acceptable or not. For instance it can request the UE measurement reports or check the average wide band CQI reports.

ABBREVIATIONS AND ACRONYMS

| | |
|---|---|
| HO | Handover |
| IRAT | Inter Radio Access Technology |
| IF | Inter Frequency |
| UTRA | Universal Terrestrial Radio Access, it is standardized by 3GPP |
| E-UTRA | Evolved UTRA and that is also standardized by 3GPP |
| UE | Name of the mobile terminal in UTRA or E-UTRA |

The invention claimed is:

1. A method for evaluating a second cell for a potential handover of a terminal that is served by a first cell, wherein the first and the second cells are co-located, and wherein the second cell is operating on a second frequency carrier in a OFDM system and the first cell operating on a first frequency carrier other than the second frequency carrier in the OFDM system or the first cell is operating in another radio access technology system than the OFDM system, the method comprising:

receiving measures from the terminal on the quality of the first and the second cell, wherein the quality measure of the first and second cells comprises an intra-cell interference component and the quality measure of the first cell includes an intra-cell interference component if the first cell is included in the OFDM system;

detecting the downlink carrier power of the second cell;

adjusting the quality measure received from the second cell, by compensating for the intra-cell interference component in the quality measures and compensating for the intra-cell interference component in the quality measure of the first cell if the first cell is included in the OFDM system;

evaluating the best cell for serving the terminal by comparing the adjusted quality measure of the second cell with the quality measure of the first cell, as adjusted if the first cell is included in the OFDM system.

2. A method according to claim 1, wherein the quality measures are the received reference signal power of respectively the first and second cell relative to the total interference comprising of intra-cell interference, inter-cell interference and noise from all sources and in adjusting the quality, the intra-cell interference is excluded while comparing the quality of the said first cell with that of the second said cell wherein the said comparison in logarithmic scale is expressed by the operation:

$$\text{Quality\_1}^{st}\text{\_cell} - \text{Quality\_2}^{nd}\text{\_cell} + P\_1^{st}\text{\_cell} - P\_2^{nd}\text{\_cell};$$

where $P\_1^{st}\_cell$ and $P\_2^{nd}\_cell$ are the power transmitted on the frequency carrier of the $1^{st}$ and $2^{nd}$ cells respectively and $\text{Quality}\_1^{st}\_cell$ and $\text{Quality}\_2^{nd}\_cell$ are the quality measure on respective cell as received from the terminal.

3. A method according to claim 1 wherein handover to the second cell is decided provided the adjusted quality measure of the second cell is better than that of the first cell, and the signal strength of the second cell is at least at a predefined level.

4. A method according to claim 1 wherein the terminal was served by a cell A from which it was handed over to the first cell, and wherein the first cell and the A cell are operating on the same frequency carrier in the OFDM system or are operating in the same radio access technology system other than the OFDM, and wherein the A cell is located on another site than the first and second cells, comprising evaluating signal strength measures on the A cell, and signal strength measures on the first cell and that are received from the terminal;

selecting the first cell for supporting the terminal if the signal strength from the first cell is better than the signal strength of the A cell.

5. A method according to claim 4, wherein the evaluating also comprises evaluating quality measures on the second cell and that are received from the terminal.

6. A method according to claim 4, wherein the first cell is selected on the further condition of the quality measure of the first cell is not worse than a offset value below the quality of the A cell.

7. A method according to claim 4, wherein the first cell is selected on the further condition of the quality measure of the first cell is at least at a predefined level.

8. A method according to claim 5 wherein the A cell when serving the terminal produces a list of recommended cells, and information on those of the recommended cells that are co-located with first cell and their respective quality measure as reported by the UE when served by the A cell, is forwarded to the first cell, and if quality is not improved in the first cell and if the second cell quality is better than that of the first cell the terminal is handed over to the second cell.

9. A method according to claim 1, wherein when the second cell serves the terminal, the terminal measures and report quality and signal strength of the second cell and at least one third cell, wherein the second and third cells are located on separate sites, and the second and third cell operate on the same frequency carrier, wherein handover to one of the third cells is decided if the signal strength of said one third cell is better that that of the second cell.

10. A method according to claim 1, wherein RSRQ is the quality measure and RSRP is the signal strength respectively measured by the terminal in a cell applying OFDM technology.

11. A method according to claim 1, wherein CPICH Ec/Io is the quality measure and CPICH RSCP is the signal strength measured by the terminal in a cell applying WCDMA technology.

12. A mobile terminal arranged for communication with a cellular radio network via a serving cell, and arranged for performing quality measurements on the serving cell and on OFDM technology cells neighbouring the serving cell, and further arranged for receiving information on which neighbouring cell/s that is/are co-located with a serving radio base station, further comprising:

means for receiving, from the serving radio base station, a compensation factor for the co-located neighbouring cell/s and for the serving cell if the serving cell is an OFDM technology cell;

means for adjusting the quality measure of the co-located neighbouring cell/s with their respective compensation factor, and for adjusting the quality of the serving cell if the serving cell is of OFDM technology; and, means for evaluating the cells by comparing the adjusted quality measure/s of the one or more co-located neighbouring cell/s with the quality measure of the serving cell, as adjusted if adjustment has been made on the serving cell, for the purpose of potentially reporting an event to the serving radio base station.

13. The mobile terminal of claim 12, wherein the receiving means is adapted for receiving the compensator factor as included in a threshold value for the respective co-located neighbour cell/s, and the difference in the quality measures of the serving cell and neighbour cell is compared to the threshold value, and dependent on the comparison the event report is triggered.

14. The mobile terminal of claim 12, wherein, for each of the co-located neighbouring cells, the adjusting means is arranged to adjust in logarithmic scale by the operation:

$$\text{Quality\_of\_serving\_cell} - \text{Quality\_of\_neighbour\_cell} + \text{compensation factor};$$

wherein the compensation factor comprises power transmitted on the frequency carrier in the serving cell minus the power transmitted on the frequency carrier in the serving cell.

15. The mobile terminal of claim 12 wherein the compensator factor is received for the respective neighbouring cells that belong to an OFDM system.

16. A radio base station arranged for providing at least two cells on a respective OFDM frequency carrier and for supporting communication with one or more mobile terminal/s in each cell, the radio base station comprising a processor arranged to:

adapt the power transmitted on each frequency carrier in accordance to a varying traffic load in the respective cell;

receive from a first mobile terminal quality measures on a first of said two or more cells that is serving the mobile terminal, and a quality measure on the second of said two or more cells, wherein the quality measures comprise an intra-cell interference component;

adjust the quality measure of respectively the first and the second cell by compensating for the intra-cell component by use of the information on the power transmitted on the frequency carrier of the respective cells; and evaluate the best fitted of the first and second cells for serving the first mobile terminal, by comparing the adjusted quality measure of the first cell with the adjusted quality measure of the second cell.

17. The radio base station of claim 16, wherein the radio base station is further arranged to provide a compensation factor to the one or more mobile terminal/s, for the mobile terminal/s to adjust the quality measure of the first and second cell, and where the said compensation factor in logarithmic scale is expressed by:

$$P \text{ 1st cell} - P \text{ 2}^{nd} \text{ cell}.$$

* * * * *

UNITED STATES PATENT AND TRADEMARK OFFICE
CERTIFICATE OF CORRECTION

PATENT NO. : 8,411,555 B2
APPLICATION NO. : 12/863845
DATED : April 2, 2013
INVENTOR(S) : Kazmi It is certified that error appears in the above-identified patent and that said Letters Patent is hereby corrected as shown below:

In the Drawings

In Fig. 3, Sheet 1 of 4, delete "singalling" and insert -- signalling --, therefor.

In the Specification

In Column 3, Line 53, delete "$\delta^2$" and insert -- $\delta_2$ --, therefor.

In Column 4, Line 4, in Equation (3), delete " $\lfloor \alpha_t^1 - \alpha_s^1) \geqq \delta_1 \rfloor \text{ AND } \lfloor (\beta_t^1 - \beta_s^1) \geqq \delta_2 \rfloor$ " and insert -- $\lfloor (\alpha_t^1 - \alpha_s^1) \geq \delta_1 \rfloor \text{ AND } \lfloor (\beta_t^1 - \beta_s^1) \geq \delta_2 \rfloor$ --, therefor.

In Column 5, Line 67, delete "factor respective" and insert -- factor for the respective --, therefor.

In Column 8, Line 10, delete "$g_A$," and insert -- $g_A$ --, therefor.

In Column 11, Line 6, delete "intre-" and insert -- inter- --, therefor.

In the Claims

In Column 12, Line 35, in Claim 4, delete "comprising" and insert -- comprising: --, therefor.

In Column 12, Line 36, in Claim 4, delete "and" and insert -- and evaluating --, therefor.

In Column 13, Line 11, in Claim 12, delete "ceil" and insert -- cell --, therefor.

In Column 14, Line 29, in Claim 17, delete "the radio" and insert -- the processor of the radio --, therefor.

In Column 14, Line 36, in Claim 17, delete "P 1st" and insert -- P $1^{st}$ --, therefor.

Signed and Sealed this
Ninth Day of July, 2013

Teresa Stanek Rea
*Acting Director of the United States Patent and Trademark Office*